US008345002B2

(12) United States Patent  (10) Patent No.: US 8,345,002 B2
Lin et al.  (45) Date of Patent: Jan. 1, 2013

(54) CONTROL APPARATUS AND METHOD FOR CONTROLLING AN IMAGE DISPLAY

(75) Inventors: Cho Yi Lin, Hsin-Chu (TW); Ming Hui Kuo, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 949 days.

(21) Appl. No.: 11/675,538

(22) Filed: Feb. 15, 2007

(65) Prior Publication Data

US 2008/0180396 A1 Jul. 31, 2008

(51) Int. Cl.
*G06F 3/033* (2006.01)

(52) U.S. Cl. ........ 345/157; 345/156; 345/158; 345/179; 345/166; 348/734; 178/19.05

(58) Field of Classification Search .......... 345/156–158, 345/163, 166, 179; 348/734; 178/19.05
See application file for complete search history.

(56) References Cited

U.S. PATENT DOCUMENTS

| 4,959,721 | A * | 9/1990 | Micic et al. | 348/734 |
| 5,703,623 | A | 12/1997 | Hall et al. | |
| 6,765,555 | B2 * | 7/2004 | Wu | 345/166 |
| 8,089,455 | B1 * | 1/2012 | Wieder | 345/156 |
| 8,125,574 | B2 * | 2/2012 | Wu et al. | 348/734 |
| 2003/0169233 | A1 * | 9/2003 | Hansen | 345/158 |
| 2004/0012566 | A1 * | 1/2004 | Bradski | 345/158 |
| 2006/0244726 | A1 | 11/2006 | Wang et al. | |
| 2006/0284791 | A1 * | 12/2006 | Chen et al. | 345/8 |
| 2006/0284841 | A1 * | 12/2006 | Hong et al. | 345/157 |
| 2008/0284724 | A1 * | 11/2008 | Alten | 345/156 |
| 2009/0278799 | A1 * | 11/2009 | Wilson | 345/158 |
| 2012/0154268 | A1 * | 6/2012 | Alten | 345/156 |

FOREIGN PATENT DOCUMENTS

| JP | 07146123 | 6/1995 |
| JP | 08033071 | 2/1996 |
| JP | 2001208511 | 8/2001 |
| TW | 094117030 | 12/2005 |

* cited by examiner

*Primary Examiner* — Lun-Yi Lao
*Assistant Examiner* — Kelly B Hegarty

(57) ABSTRACT

A control apparatus for controlling an image display includes at least one reference object for generating a predetermined spectrum signal; a modulation unit for modulating the predetermined spectrum signal with a predetermined method; and a remote controller. The remote controller includes an image sensor for receiving the modulated predetermined spectrum signal and generating a digital signal; and a processing unit for receiving the digital signal, demodulating the digital signal so as to generate a digital image which only contains the image of the reference object, and calculating an image variation of the image of the reference object formed on the digital image, wherein the remote controller controls the image display according to the image variation thereby eliminating the interference from a light source which generates a light band overlapping the band of the predetermined spectrum signal. The present invention also provides a control method for controlling an image display.

17 Claims, 11 Drawing Sheets

CONTROL APPARATUS AND METHOD FOR CONTROLLING AN IMAGE DISPLAY

BACKGROUND OF THE INVENTION

1. Field of the Invention

This invention generally relates to an apparatus and method for controlling an image display, which utilizes at least one reference object to generate modulated spectrum signals and an image sensor to detect the spectrum signals and to calculate an image variation of the reference object so as to control the image display.

2. Description of the Related Art

A conventional cursor control method disclosed in Taiwan Patent Publication No. 200540687, entitled "Apparatus for cursor control and method thereof" provides a hand-held device for controlling a cursor in a display. First, a movement is detected by the hand-held device. A position differential is calculated according to the detected movement. Then, the hand-held device wirelessly transmits the position differential to a specific device to control the cursor activity accordingly, and operate an application on the specific device according to the cursor activity. However, in practical use, when the hand-held device is utilized to detect an image area, the position of the detected image on a sensing array of the hand-held device may be affected by a distance between the hand-held device and the object to be photographed, and also be affected by a rotating angle of the hand-held device while photographing. If the distance and the rotating angle are not corrected, error control of the cursor activity may occur during operation. In addition, since the detected image includes all objects inside the viewing angle of the hand-held device, the image recognition is relatively complicated.

In order to solve the problem existing in the art, in the commonly owned Taiwan Patent Application No. 095116011, entitled "Pointer positioning apparatus and method" and Taiwan Patent Application No. 0951149408, entitled "Cursor controlling method and apparatus using the same", at least one reference object is utilized for generating an IR signal, e.g. 940 nm wavelength, and an IR filter is integrated on an image sensor to filter out optical signals outside the band of the IR signal such that an image sensor can only detect IR signals generated from the reference object thereby decreasing the complexity of image recognition. An image display can be controlled according to an image variation, e.g. position displacement, of the image of the reference object detected by the image sensor. However, although the function of the image sensor will not be interfered while operating under a fluorescent light (350 to 750 nm wavelengths) environment, it will still be interfered by a halogen lamp light source (350 to 1100 nm wavelengths) which exists in the same environment, especially when the halogen lamp light source is placed nearby the reference object. The image detected by the image sensor through the IR filter will include both the reference object and the halogen lamp light source such that error recognition will occur during image post-processing and hence it may be unable to correctly control the image display. In addition, the sunlight is another light source which may influence the normal function of the control apparatus.

Accordingly, there exists a need to further improve the conventional image display control apparatus so as to improve the control accuracy thereof.

SUMMARY OF THE INVENTION

It is an object of the present invention to provide a control apparatus and method for controlling an image display, which utilizes at least one reference object for generating a modulated predetermined spectrum signal. A remote controller detects the modulated predetermined spectrum signal and controls the image display according to its detection. Since the remote controller can eliminate the interference from the environmental light sources, the control accuracy on the image display can be increased.

In order to achieve the above object, the control apparatus according to the present invention includes at least one reference object for generating a predetermined spectrum signal; a modulation unit for modulating the predetermined spectrum signal with a predetermined method; and a remote controller. The remote controller includes an image sensor for receiving the modulated predetermined spectrum signal and generating a digital signal; and means for receiving the digital signal, demodulating the digital signal so as to generate a digital image which only contains the image of the reference object, and calculating an image variation of the image of the reference object formed on the digital image, wherein the remote controller correspondingly controls the image display according to the image variation thereby eliminating the interference from other light source which generates a light band overlapping the band of the predetermined spectrum signal.

The present invention further provides a control method for controlling an image display, including the steps of: providing at least one reference object for generating a predetermined spectrum signal; modulating the predetermined spectrum signal with a predetermined method; providing an image sensor for receiving the modulated predetermined spectrum signal and generating a digital signal; demodulating the digital signal so as to generate a digital image which only contains the image of the reference object; calculating an image variation of the image of the reference object formed on the digital image; and controlling the image display according to the image variation, thereby eliminating the interference from other light source which generates a light band overlapping the band of the predetermined spectrum signal.

The control apparatus and method for controlling an image display according to the present invention can be applied to control any types of image display, e.g. a computer screen, the screen of a game machine, a projection screen, a monitor or a television. In one embodiment, the control apparatus and method can be utilized to control the activity of a cursor on a control interface or a user interface of the image display thereby performing function statuses setting and adjusting thereof. In another embodiment, a remote controller of the control apparatus can be rotated during operation so as to simulate the rotation of an analog knob thereby controlling the function statuses of the image display. The television can be a CRT (cathode ray tube) display, a LCD (liquid crystal display) or a PDP (plasma display panel).

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

Figure 1:
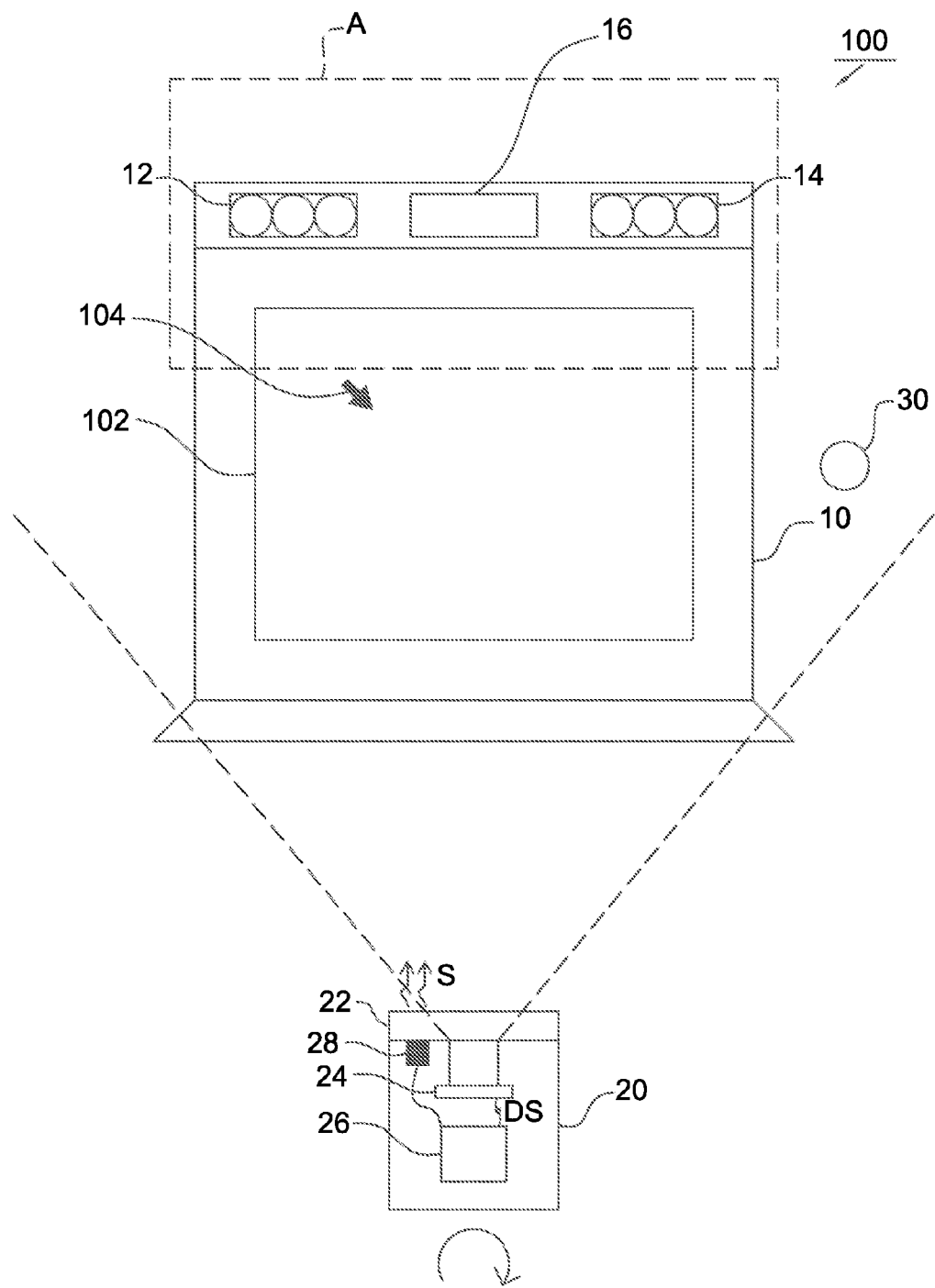
FIG. 1 shows a schematic view of a control apparatus for controlling an image display according to the first embodiment of the present invention.

Referring to FIG. 1, there is shown a control apparatus 100 for controlling an image display 10 according to the first embodiment of the present invention. The control apparatus 100 includes an image display 10 with a display screen 102 for showing image pictures, two reference objects 12 and 14, a modulation unit 16 and a remote controller 20. Embodiment of the image display 10 is selected from the group consisting of a television, the screen of a game machine, a projection screen, a monitor, a computer screen and any other kinds of devices which can display image pictures. The setting and adjusting of function statuses of the image display 10, e.g. volume adjusting, channel selecting, hue setting, sound setting etc., may be activated through a user interface. The user interface may be controlled through a cursor 104 shown on the display screen 102 and the cursor 104 is controlled by a control panel (not shown) or the remote controller 20.

The reference objects 12 and 14 generate a predetermined spectrum signal. One embodiment of the reference objects 12 and 14 is a combination of IR LEDs (infrared light emitting diode), e.g. LEDs with 940 nm wavelength. The reference objects 12 and 14 can be configured by various combinations of IR LEDs to form different shapes, for example in this embodiment, the reference objects 12 and 14 are respectively configured as a line shape by arranging three IR LEDs in straight line. In other embodiment, the reference objects 12 and 14 can be configured as a star shape with different areas; in an alternative embodiment, one of them can be configured as a line shape and the other can be configured as a dot shape. The modulation unit 16 is electrically coupled to the reference objects 12, 14 for modulating the predetermined spectrum signal generated therefrom in a predetermined method, e.g. periodic modulation with a predetermined modulation frequency. For instance, in one embodiment, the predetermined modulation frequency is 20 Hz and it is utilized to modulate the predetermined spectrum signals generated from the reference objects 12 and 14 simultaneously. In other embodiment, the predetermined spectrum signals generated from the reference objects 12 and 14 can be modulated respectively with different predetermined modulation frequencies. It should be noted that if the predetermined spectrum signals generated from the reference objects 12 and 14 are modulated respectively by two different predetermined modulation frequencies, preferably the two different predetermined modulation frequencies have a multiple relationship so as to synchronize the predetermined spectrum signals generated by the reference object 12 with the reference object 14. For instance, if the predetermined spectrum signals generated by the reference object 12 are modulated by 20 Hz (lighting once per 50 ms) while the predetermined spectrum signals generated by the reference object 14 are modulated by 40 Hz (lighting once per 25 ms), then each time the reference object 14 lights for the second times, the reference object 14 lights for one time, and the reference objects 12 and 14 preferably light simultaneously so as to synchronize with each other. In addition, the reference objects 12 and 14 may be modulated by inverse frequencies. In other embodiment, the predetermined spectrum signal can be modulated by non-periodic modulation. In this manner, the predetermined spectrum signals generated from the reference objects 12 and 14 can be distinguished from environmental light sources which emit light band partially or completely overlapping the band of the predetermined spectrum signal. In addition, the reference objects 12 and 14 and the modulation unit 16 can be integrated on the image display 10, or they can be manufactured as a discrete component which is placed nearby the image display 10 during operation.

The remote controller 20 includes an optical filter 22, an image sensor 24, a processing unit 26 and a wireless communication unit 28. The remote controller 20 receives the predetermined spectrum signals from the reference objects 12 and 14 through the image sensor 24 to form a digital image, and correspondingly controls the image display 10 according to an image variation, e.g. a position variation or an rotating angle variation, of the images of the reference objects 12 and 14 formed on the digital image; the detail will be illustrated in the following paragraphs. For example, if the image display 10 is a television, then the remote controller 20 is a TV remote controller to perform general TV controls; if the image display 10 is the screen of a game machine, then the remote controller 20 is utilized for controlling the game being played on the screen; if the image display 10 is a projection screen, then the remote controller 20 is a mouse or the like for controlling a software on the projection screen. It should be understood, the above mentioned display types and control methods are only exemplary embodiments, they are not used to limit the present invention; in other embodiment, any kinds of controls can be performed on other kinds of displays. The wireless communication unit 28 is under the control of the processing unit 26 and then sends a control signal S to the image display 10 and controls the image display 10 accordingly.

Figure 2A:
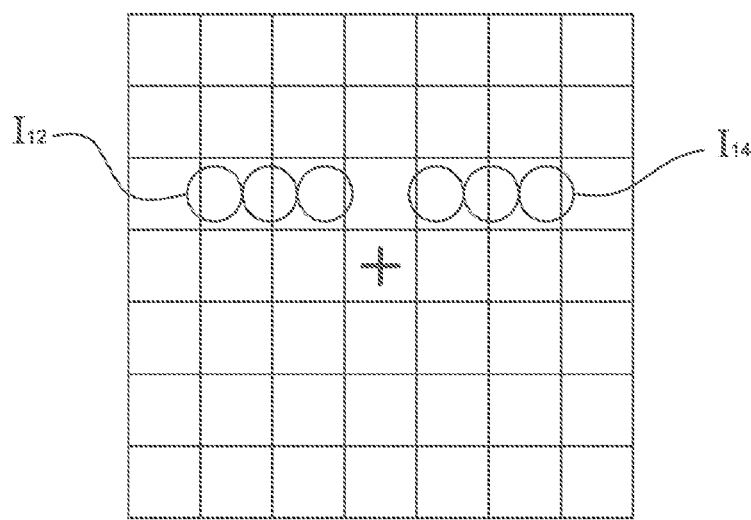
FIG. 2a shows a schematic view of an image detected by an image sensor of the control apparatus according to the embodiment of the present invention, wherein the control apparatus has a modulation unit for modulating the predetermined spectrum signal so as to eliminate the interference from the environmental light sources.
Figure 2B:
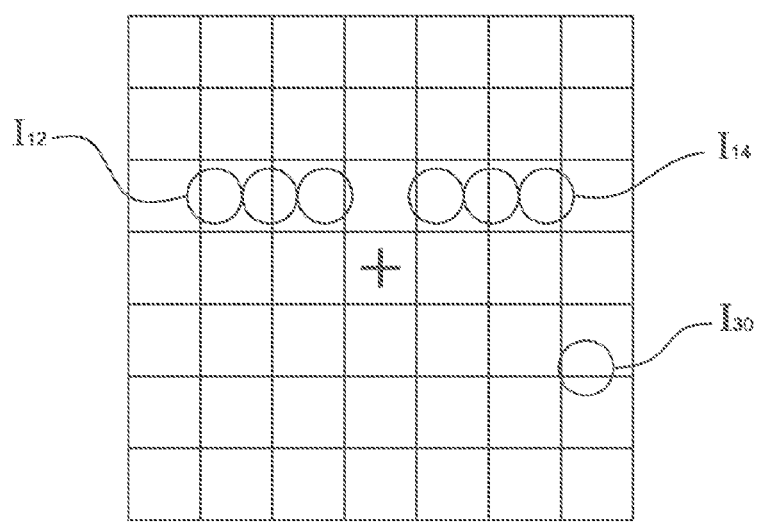
FIG. 2b shows a schematic view of an image detected by an image sensor of the control apparatus according to the embodiment of the present invention, wherein the control apparatus does not have a modulation unit for modulating the predetermined spectrum signal and the interference from the environmental light sources can not be eliminated.

Referring to FIGS. 1, 2a and 2b, when the first embodiment of the present invention is during operation, for illustration purpose, it is assumed that a light source 30 exists nearby the image display 10 and is inside the viewing angle of the image sensor 24. The light source 30, e.g. a halogen lamp or a sun light source, emits light signals whose band overlap part of or the whole of the band of the predetermined spectrum signals generated from the reference objects 12 and 14. First, the predetermined spectrum signals generated by the reference objects 12 and 14 are assumed to be modulated by the modulation unit 16 with periodic modulation having a predetermined modulation frequency. In order to have the image sensor 24 detect the predetermined spectrum signals, the predetermined modulation frequency is preferably lower than an image sampling frequency of the image sensor 24, which is the frame number that the image sensor 24 samples per second. The image sampling frequency preferably has a multiple relationship with the predetermined modulation frequency so as to synchronize the image sampling of the imager sensor 24 with the lighting of the reference objects 12 and 14. For instance, in one embodiment the sampling frequency of the image sensor 24 is 200 Hz (sampling once per 5 ms) and the predetermined modulation frequency used to modulate the reference objects 12 and 14 is 20 Hz (lighting once per 50 ms). When the image sensor 24 samples the tenth times, the reference objects 12 and 14 both light simultaneously such that the image sensor 24 can successfully detect the predetermined spectrum signals from the reference objects 12 and 14. It should be understood that if the reference objects 12 and 14 are respectively modulated by two different predetermined modulation frequencies, each of the predetermined modulation frequencies has a multiple relationship with the sampling frequency of the image sensor 24.

Then the image sensor 24 receives the predetermined spectrum signals generated by the reference objects 12 and 14 through the optical filter 22. Since the optical filter 22 can filter out the signals outside the band of the predetermined spectrum signal, the image sensor 24 can only detect the optical signals of the reference objects 12, 14 and the light source 30, and then generates a digital signal "DS". The processing unit 26 receives the digital signal "DS" and correspondingly controls the image display 10 according to an image variance of the images of the reference objects 12 and 14. In the present invention, the processing unit 26 controls the image display 10 based on the calculation of the image variations of the reference objects 12 and 14, and if the signal of the light source 30 exists in the calculation procedure, the error control may occur. Therefore, the processing unit 26 has to demodulate the modulated signals from the digital signals "DS" so as to form a digital image which only contains the images of the reference objects 12 and 14, as shown in FIG. 2a, where $I_{12}$ and $I_{14}$ denote images of the reference objects 12 and 14 respectively. Finally, the processing unit 26 calculates the image variations of the images $I_{12}$ and $I_{14}$ of the reference objects 12, 14 and controls the wireless communication unit 28 to send a control signal S to the image display 10 and correspondingly control thereof. In this manner, the interference to the control apparatus 100 caused by other light sources in the environment can be eliminated thereby increasing control accuracy. On the contrary, if the control apparatus 100 does not have the modulation and demodulation mechanisms, the digital image created by the processing unit 26 may include all of the images of the reference objects 12, 14 and the light source 30, i.e. $I_{12}$, $I_{14}$ and $I_{30}$, as shown in FIG. 2b.

Figure 3:
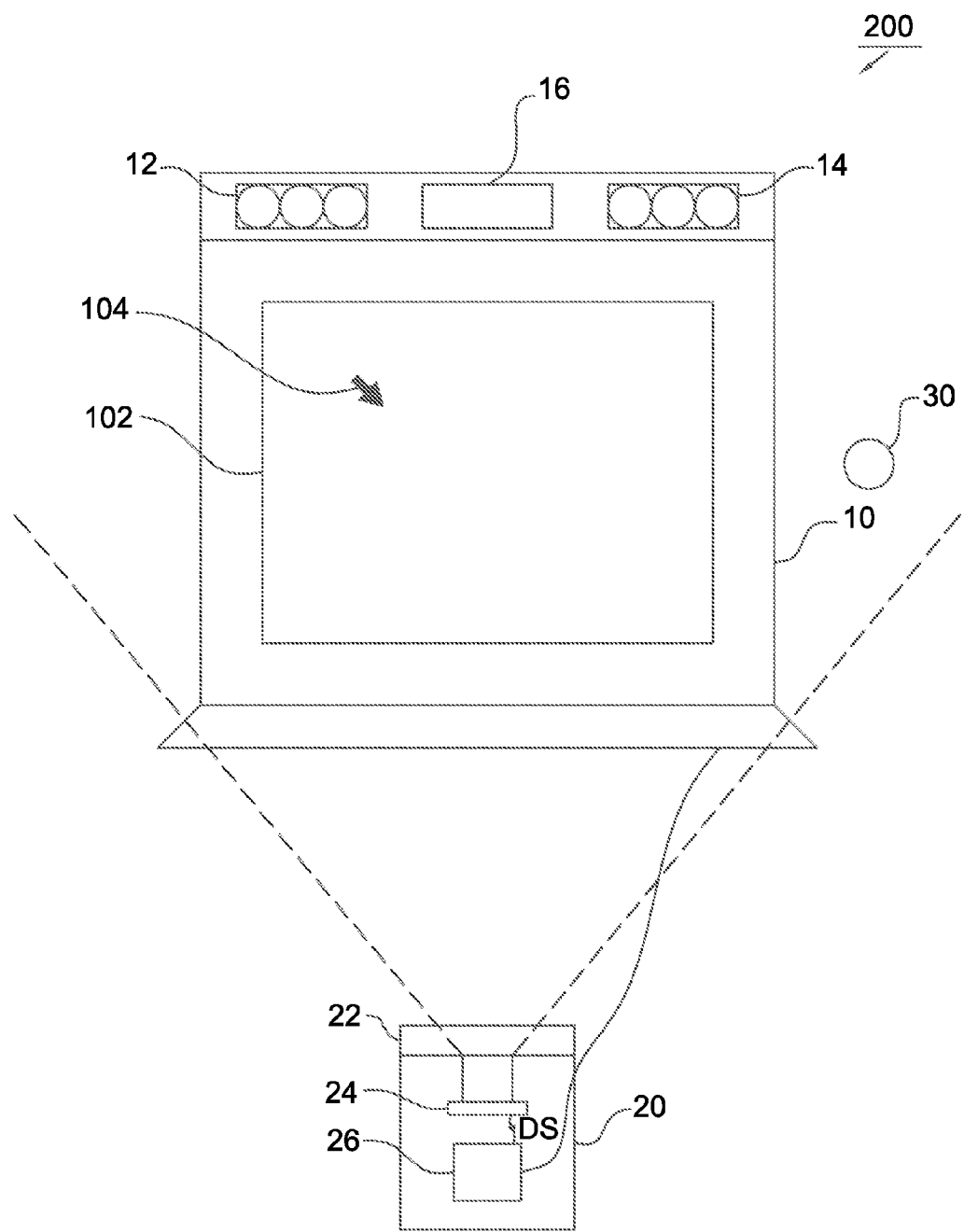
FIG. 3 shows a schematic view of a control apparatus for controlling an image display according to the second embodiment of the present invention.

Referring to FIG. 3, it shows a control apparatus 200 for controlling an image display 10 according to the second embodiment of the present invention, wherein the remote controller 20 is electrically connected to the image display 10 so as to correspondingly control thereof. For example, in a game system the remote controller may electrically connect to the display screen so as to control the game proceeding. The control apparatus 200 also includes the image display 10, the reference objects 12 and 14, the modulation unit 16 and the remote controller 20. Similarly, the remote controller 20 receives the predetermined spectrum signals generated from the reference objects 12 and 14 through the image sensor 24 and forms a digital signal "DS". The processing unit 26 generates a digital image according to the digital signal "DS" and controls the image display 10 according to the image variation of the images of the reference objects 12 and 14 on the digital image. The modulation unit 16 is utilized to modulate the predetermined spectrum signals generated by the reference objects 12 and 14 with the predetermined method illustrated in the first embodiment such that the digital image demodulated from the digital signal "DS" by the processing unit 26 can eliminate the interference caused by other light sources in the environment. It should be noted that although two reference objects 12 and 14 are used as an example for illustrating the embodiments of the present invention, it is not used to limit the present invention. In other embodiment, only one reference object may be used as the reference for image recognition, or only one of the reference objects 11 and 12 is modulated by the modulation unit 16 and the modulated one is used as the reference for image recognition. The following paragraphs illustrate two embodiments in which the control apparatus 100 or 200 controls the image display 10 according to an image variation, e.g. a position variation or a rotating angle variation, of the images of the reference objects 12, 14 formed on the digital image.

Referring to FIGS. 4 to 7, in one embodiment, the control apparatus 100 or 200 is utilized to control the movement of a cursor 104 on the display screen 102 of the image display 10. The reference objects 12, 14 herein are configured as identical star shape but with different areas, e.g. the reference object 12 is a large star shaped configuration and its corresponding image is shown as $I_{12}$; the reference object 14 is a small star shaped configuration and its corresponding image is shown as $I_{14}$. The cursor control method includes the steps of: providing two reference objects for generating a modulated predetermined spectrum signal and defining a predetermined range surrounding the reference objects (step 150); providing an image sensor for aiming at a point inside the predetermined range (step 250); utilizing the image sensor to receive the predetermined spectrum signal and to form a digital image (step 300); recognizing the positions and the shapes of the images of the reference objects on the digital image and generating a first parameter (step 400); performing distance compensation and rotating angle compensation on the first parameter (step 500); moving the aiming point of the image sensor inside the predetermined range and generating a second parameter (step 600); and calculating a moving distance of the images of the reference objects on the digital image according to the second parameter and the compensated first parameter so as to correspondingly control the movement of the cursor (step 700). Wherein, in step 700, the distance and the rotating angle compensations on the second parameter are performed together with the calculation (step 710). A scale parameter is used in step 700 to adjust the moving sensitivity of the cursor 104 on the display screen 102 (step 720), wherein step 720 can be neglected according to different applications.

Figure 4:
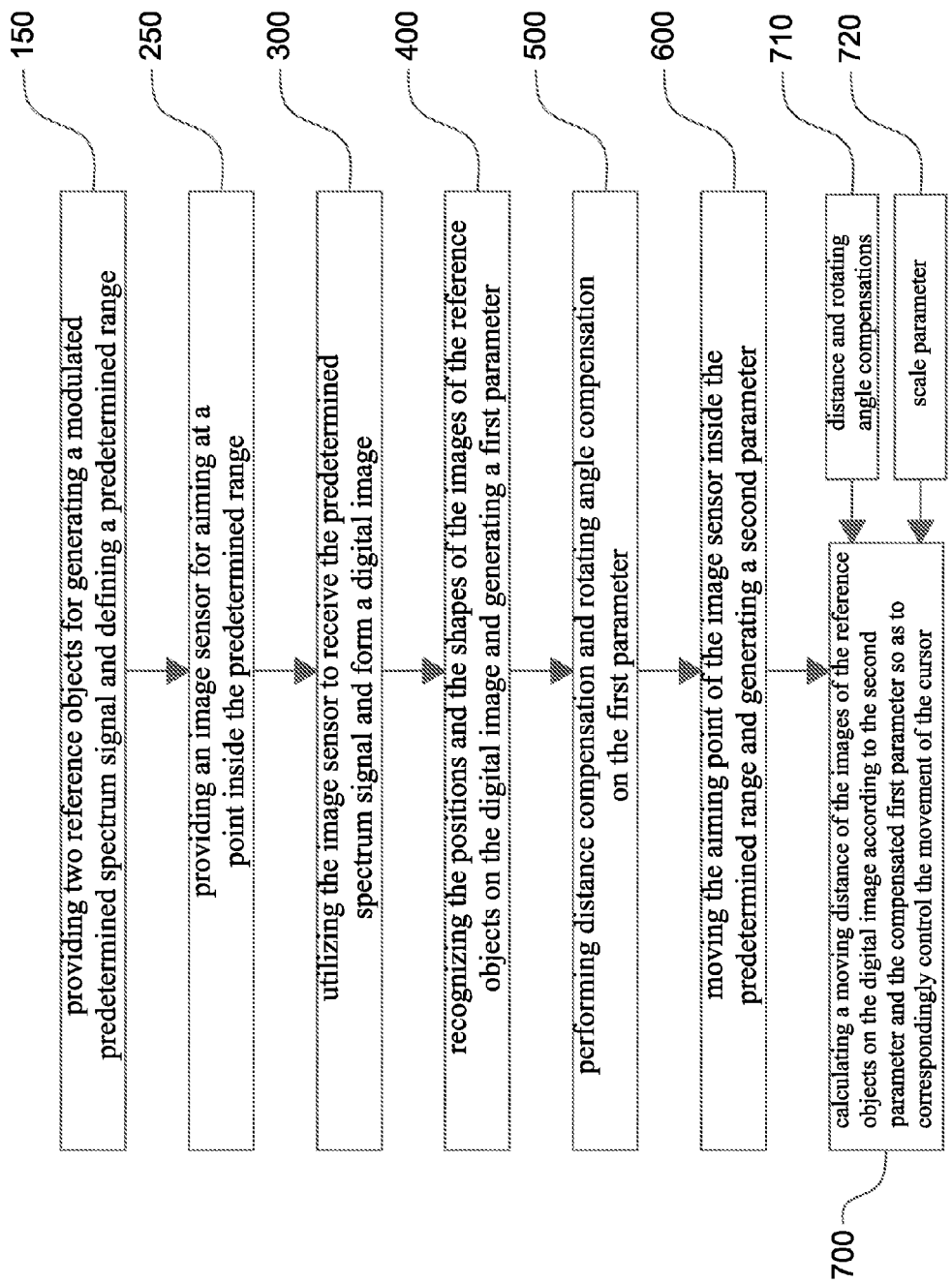
FIG. 4 shows a flow chart of controlling the movement of a cursor on an image display by means of the control apparatus according to the embodiment of the present invention.
Figure 5A:
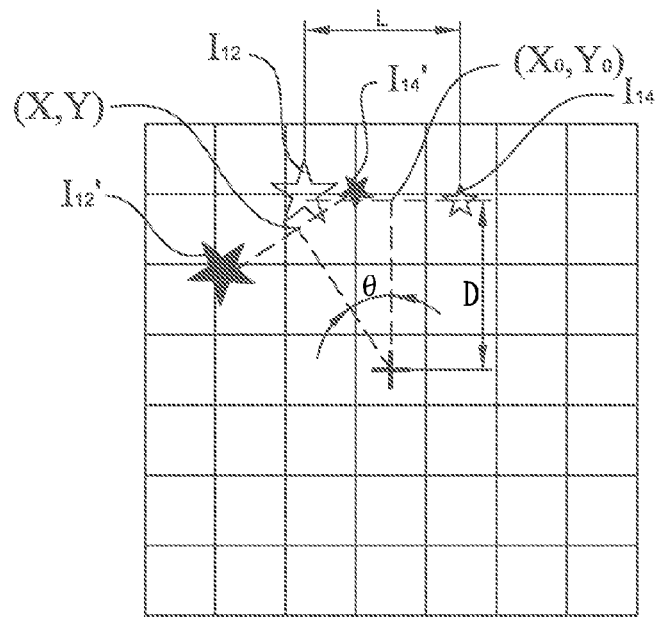
FIG. 5a shows a schematic view of an image detected by the image sensor of the control apparatus according to the embodiment of the present invention, wherein the image sensor rotates clockwise by an angle θ while photographing.

Referring to FIGS. 1, 4 and 5a, before the control apparatus 100 or 200 leaves the factory, a predetermined position parameter and a predetermined distance parameter are preferably stored in the processing unit 26. They are parameters obtained according to the images $I_{12}$ and $I_{14}$ of the reference objects 12 and 14, as shown in FIG. 5a, wherein the images $I_{12}$ and $I_{14}$ are detected by the image sensor 24 when the remote controller 20 operates at a predetermined distance, e.g. 3 meters, from the reference objects 12 and 14. The parameters are utilized as references for distance compensation and rotating angle compensation. The predetermined position parameter and the predetermined distance parameter can be defined according to a plane coordinate system formed by the sensing array of the image sensor 24, e.g. a plane coordinate system having the center "+" of the sensing array as its original point. For instance, the predetermined position parameter may contain coordinates of the images $I_{12}$ and $I_{14}$ of the reference objects 12 and 14, their average coordinate $(X_0, Y_0)$ and a tilt angle of a connection line between the images $I_{12}$ and $I_{14}$ in the plane coordinate system; the predetermined distance parameter may contain a distance "L" between two images $I_{12}$ and $I_{14}$ and/or a distance "D" between their average coordinate $(X_0, Y_0)$ of the images $I_{12}$, $I_{14}$ and the center "+" of the sensing array in the plane coordinate system.

First, the reference objects 12 and 14 generate predetermined spectrum signals, e.g. IR signals. Then a sensible range "A" can be determined according to the viewing angle of the image sensor 24 and the emitting angle of the reference objects 12 and 14 (step 150). Next, utilize the image sensor 24 of the remote controller 20 to aim at an arbitrary point inside the sensible range "A" (step 250). Since the image sensor 24 of the present invention can only sense the predetermined spectrum signals and the predetermined spectrum signals generated from the reference objects 12 and 14 are modulated by the modulation unit 16, the processing unit 26 creates a digital image only containing the images of the reference objects 12 and 14, i.e. $I_{12}'$ and $I_{14}'$ as shown in FIG. 5a, (step 300). Further, in this embodiment, it is assumed that the remote controller 20 rotates an angle θ in the clockwise direction while operating, therefore there is an angle deviation θ between the images $I_{12}'$, $I_{14}'$ and the images $I_{12}$, $I_{14}$ which are detected by the image sensor 24 while photographing in the predetermined distance. The average coordinate (X, Y) of the images $I_{12}'$ and $I_{14}'$ and the average coordinate $(X_0, Y_0)$ of the images $I_{12}$ and $I_{14}$ will appear at different positions on the digital image although they are both detected by the image sensor 24 aiming at the same point inside the sensible range "A".

Referring to FIGS. 1, 4, 5a and 5b, the processing unit 26 recognizes the positions and the shapes of the images $I_{12}'$ and $I_{14}'$ and generates a first parameter which contains a first position parameter, a first distance parameter and a shape parameter (step 400). The processing unit 26 compensates the images $I_{12}$ and $I_{14}$ according to the angle θ between the first position parameter, including an average coordinate of the images $I_{12}'$ and $I_{14}'$ and a tilt angle of the connection line therebetween, and the predetermined position parameter, including an average coordinate of the images $I_{12}$ and $I_{14}$ and a tilt angle of the connection line therebetween. The rotating angle compensation is accomplished by equation (1):

$$\begin{bmatrix} X' \\ Y' \end{bmatrix} = \begin{bmatrix} \cos(\theta) & -\sin(\theta) \\ \sin(\theta) & \cos(\theta) \end{bmatrix} \begin{bmatrix} X \\ Y \end{bmatrix} \qquad (1)$$

where θ denotes an angle deviation between the first position parameter and the predetermined position parameter; X and Y denote the average coordinates of the first position parameter before being compensated; X' and Y' denote the average coordinates of the first position parameter after being compensated. After the rotating angle compensation is held, the images of the reference objects 12 and 14 are compensated to images under the same basis, i.e. a user operating the remote controller 20 at the same distance from the image display 10. In this manner, the image sensor 24 can detect identical images under any rotating angle as long as aiming at the same point.

Figure 5B:
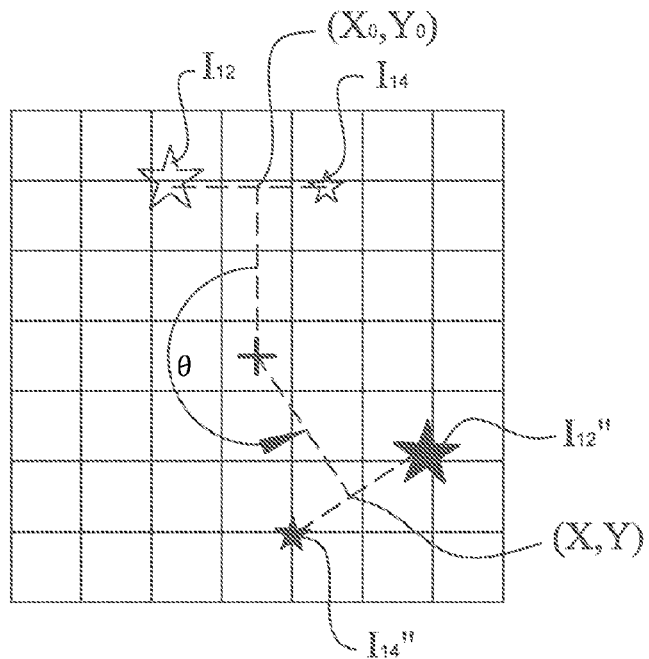
FIG. 5b shows a schematic view of an image detected by the image sensor of the control apparatus according to the embodiment of the present invention, wherein the image sensor rotates clockwise by an angle θ larger than 180 degrees while photographing.

However, if the angle deviation θ is larger than 180 degrees to form the images $I_{12}''$ and $I_{14}''$ as shown in FIG. 5b and there is no difference between the reference objects 12 and 14, i.e. reference objects 12 and 14 have identical sizes and shapes, it is impossible to distinguish that the images $I_{12}''$ and $I_{14}''$ are formed by rotating the images $I_{12}'$ and $I_{14}'$, as shown in FIG. 5a, or by moving thereof. Therefore in this embodiment, two reference objects 12 and 14 with different sizes are utilized. Each position of the images of the reference objects $I_{12}$ and $I_{14}$ will be recognized first according to the shape parameter, e.g. areas of the images of the reference objects $I_{12}$ and $I_{14}$, stored in the processing unit 26, and then compensate the rotating angle. In this manner, the rotating angle compensation can be correctly performed even though the rotating angle of the remote controller 20 during operation is larger than 180 degrees.

Figure 6:
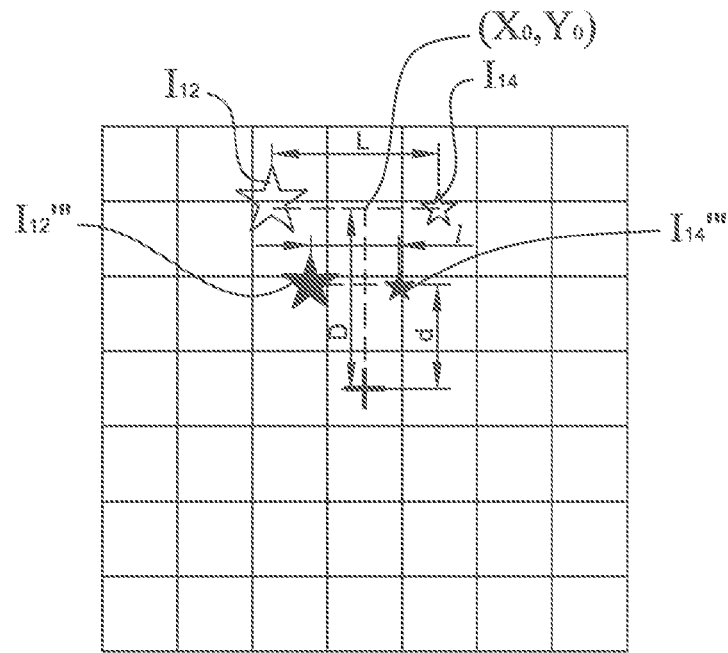
FIG. 6 shows a schematic view of an image detected by the image sensor of the control apparatus according to the embodiment of the present invention, wherein the image sensor photographs at different photographing distances.

Referring to FIG. 6, there is shown a method to perform distance compensation utilized in the embodiment of the present invention. The images $I_{12}$ and $I_{14}$ are also detected by the imaged sensor 24 of the remote controller 20 while photographing at the predetermined distance. When the photographing distance between the remote controller 20 and the reference objects 12 and 14 is getting larger, the images detected by the image sensor 24 are getting smaller and the average coordinate of the images $I_{12}$ and $I_{14}$ is getting closer to the center "+" of the sensing array of the image sensor 24, shown as $I_{12}'''$ and $I_{14}'''$ in FIG. 6. However, a position deviation caused by this action does not represent that the user changes his aiming point of the remote controller 20 on the display screen 102. If the position deviation is not corrected, error recognition of moving the aiming point of the remote controller 20 will occur when the photographing distance of the remote controller 20 is changed. In the illustration herein, it is assumed that the distance between two predetermined images $I_{12}$ and $I_{14}$ is "L" and the distance between the predetermined average coordinate of the images of the reference objects $I_{12}$, $I_{14}$ and the center "+" of the sensing array is "D";

the distance between two images $I_{12}'''$ and $I_{14}'''$ in the first distance parameter is "l" and the distance between the average coordinate of the images of the reference objects $I_{12}'''$ and $I_{14}'''$ in the first distance parameter and the center "+" of the sensing array is "d". The distance deviation can be compensated by equation (2) (step 500):

$$\frac{D}{L} = \frac{d}{l} \qquad (2)$$

Figure 7:
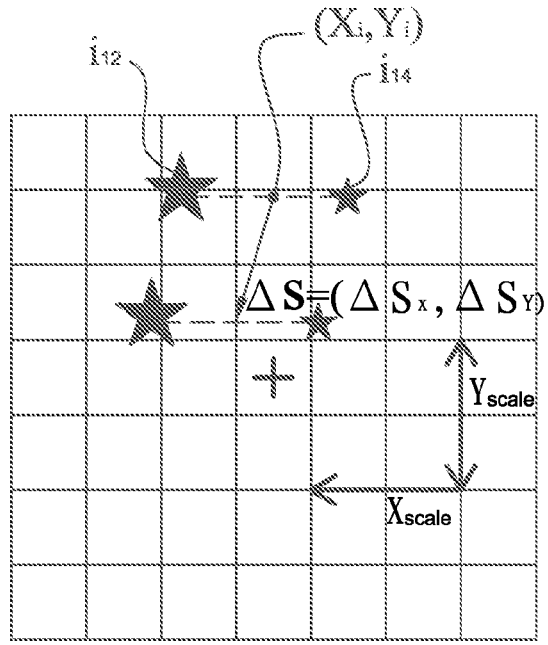
FIG. 7 shows a schematic view of an image detected by the image sensor of the control apparatus according to the embodiment of the present invention, wherein the image sensor aims at different points while photographing.

Referring to FIG. 7, it is assumed that the images after being compensated are $i_{12}$ and $i_{14}$, and they are images based on a predetermined distance and rotating angle basis, and their average coordinate is $(X_i, Y_i)$. Then move the aiming point of the remote controller 20 inside the sensible range "A" (step 600). The image sensor 24 continuously transmits its detected digital signal "DS" to the processing unit 26 which then generates a second parameter according to the digital signal "DS". The second parameter contains a second position parameter and a second distance parameter, and they are obtained from the images of the reference objects 12 and 14 detected by the remote controller 20 after moving its aiming point. The second position parameter may be defined as an average coordinate of the images of the reference objects 12 and 14 according to a plane coordinate system formed by the sensing array of the image sensor 24, e.g. a plane coordinate system having the center "+" of the sensing array as its original point; the second distance parameter may be defined as a distance between the images of the reference objects 12 and 14 according to the same plane coordinate system. The processing unit 26 continuously calculates the moving distance ΔS of the images $i_{12}$ and $i_{14}$ according to the second position parameter and the compensated first position parameter, and the second parameter is compensated by the aforementioned distance and rotating angle compensation during calculation (step 710) so as to correctly control the moving of the cursor 104 on the display screen 102. Since the compensations on the second parameter are identical to that on the first parameter, their details will not be described herein. Then, the processing unit 26 electrically or wirelessly transmits the calculation results to the image display 10. Preferably, application software is installed in the image display 10 for controlling its user interface and the cursor 104 on the display screen 102. After the application software receives the control signal S from the processing unit 26, it can correspondingly control the cursor 104 to move on the display screen 102 (step 700). In addition, during the calculation of the moving distance ΔS of the images $i_{12}$ and $i_{14}$, a group of scale parameters $X_{scale}$ and $Y_{scale}$ can be inputted thereto (step 720), which are utilized to control a moving sensitivity of the cursor 104 on the display screen 102. For instance, the moving distance ΔS can be controlled by equation (3):

$$\Delta S = \left( \frac{\Delta S_X}{X_{scale}}, \frac{\Delta S_Y}{Y_{scale}} \right) \qquad (3)$$

Where $\Delta S_X$ denotes a moving distance in the horizontal direction and $\Delta S_Y$ denotes a moving distance in the vertical direction. It can be seen from equation (3) that when the values of $X_{scale}$ and $Y_{scale}$ are getting larger, the moving sensitivity of the cursor 104 become smaller, i.e. the moving distance of the aiming point aimed by the remote controller 20 has to be relatively large so as to obtain the same moving effect of the cursor 104 on the display screen 102; on the contrary, when the values of $X_{scale}$ and $Y_{scale}$ are getting smaller, the moving sensitivity of the cursor 104 become larger, i.e. the moving distance of the aiming point aimed by the remote controller 20 need not to be so large to obtain the same moving effect of the cursor 104 on the display screen 102. In this manner, the practicability of the control apparatus 100 or 200 can be increased.

Referring to FIGS. 8 to 10*e*, in another embodiment, the control apparatus 100 or 200 can be utilized to simulate a rotation of an analog knob so as to control the function statuses of the image display 10. Now referring to FIG. 8, the control method includes the following steps: providing two reference objects for generating a modulated predetermined spectrum signal and defining a predetermined range surrounding the reference objects (step 1100); providing an image sensor for aiming at a point inside the predetermined range (step 1200); utilizing the image sensor to receive the predetermined spectrum signal and form a digital image (step 1300); recognizing the positions of the images of the reference objects on the digital image and generating a first parameter (step 1400); rotating the image sensor so as to simulate a rotation of an analog knob and generating a second parameter (step 1500); calculating a rotating angle difference from the first and the second parameters so as to correspondingly control the function status of the image display (step 1600).

Figure 8:
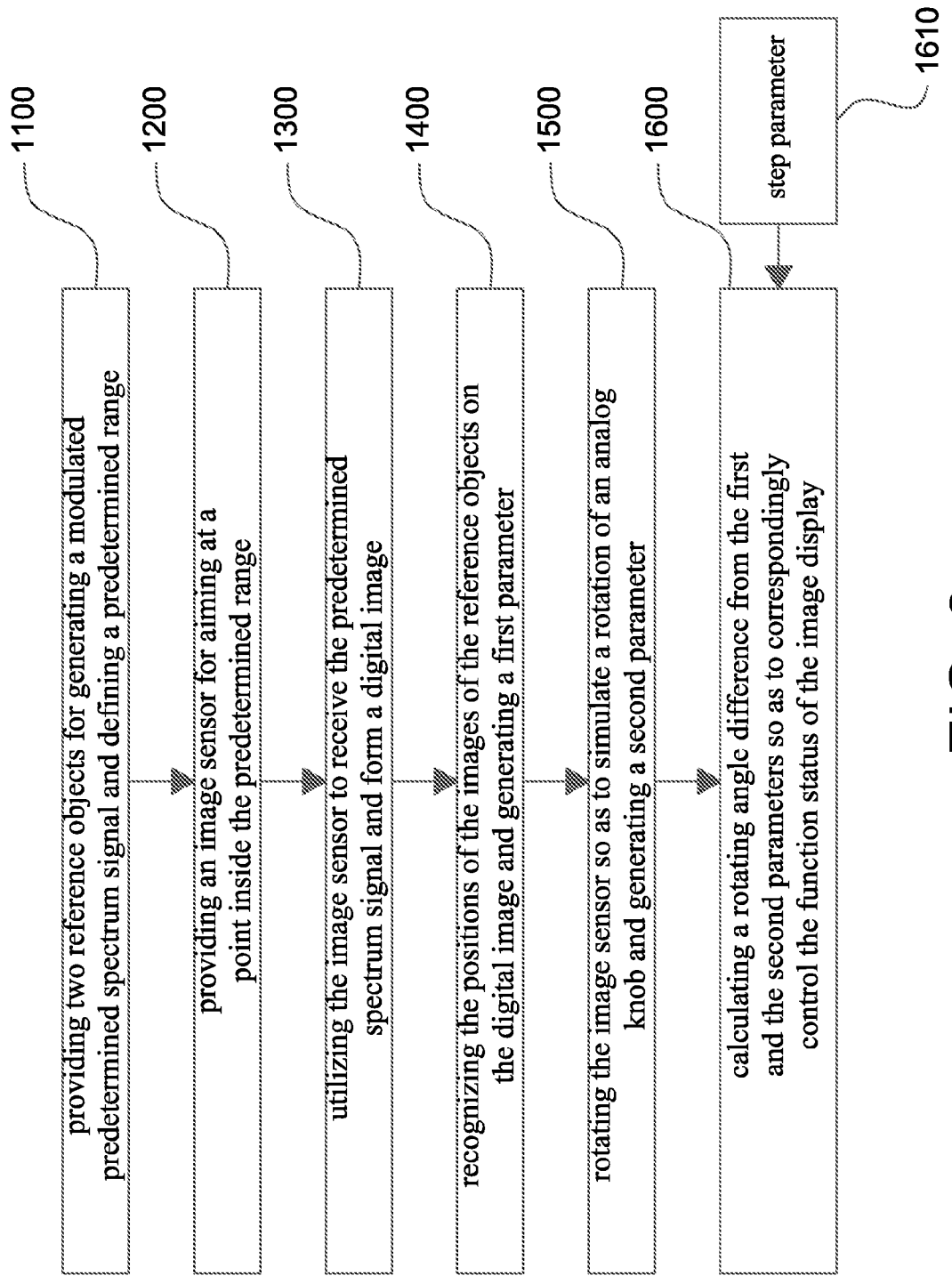
FIG. 8 shows a flow chart of controlling function statuses of an image display by means of the control apparatus according to the embodiment of the present invention.
Figure 9A:
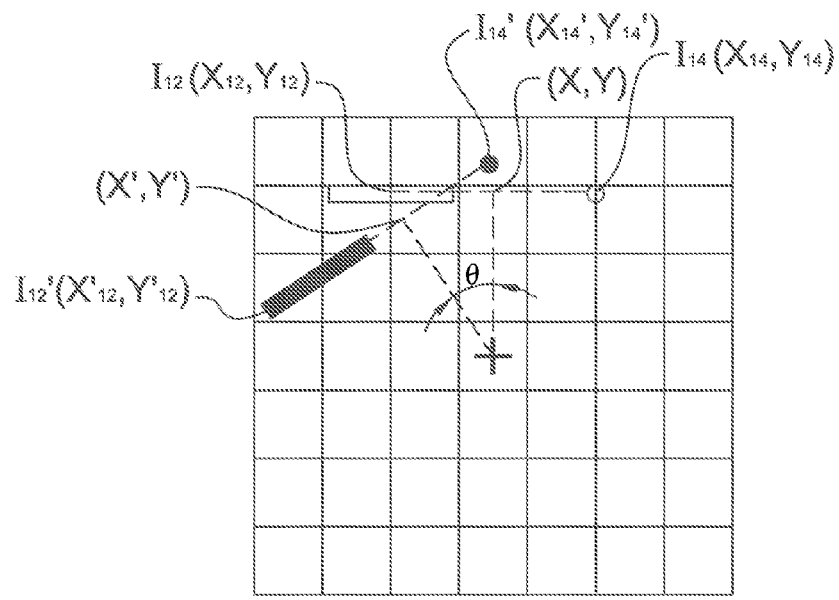
FIG. 9a shows a schematic view of a method to calculate a rotating angle of the remote controller while photographing.

Referring to FIGS. 1, 8 and 9*a*, first the reference objects 12 and 14 generate a predetermined spectrum signal, e.g. IR light with wavelengths between 0.84 to 0.94 micrometers. A sensible range "A" can be defined surrounding to the reference objects 12 and 14 and it is determined by an emitting angle of the reference objects 12 and 14 and a viewing angle of the image sensor 24 (step 1100). Next, utilize the image sensor 24 to aim at a point inside the sensible range "A" (step 1200). Since the predetermined spectrum signals generated from the reference objects 12 and 14 are modulated by the modulation unit 16, only the images $I_{12}$ and $I_{14}$ can be formed on the sensing array of the image sensor 24 (step 1300), as shown in FIG. 9*a*, and the image information are stored in the processing unit 26. Then, the processing unit 26 recognizes the positions of the images of the reference objects 12 and 14 and generates a first parameter (step 1400), which is also stored in the processing unit 26. The first parameter contains the coordinates and average coordinate of the images of the reference objects 12 and 14 on a plane coordinate system formed by the sensing array of the image sensor 24, e.g. a plane coordinate system having the center "+" of the sensing array as its origin point. For instance, the coordinates of the images of the reference objects $I_{12}$ and $I_{14}$ are respectively $(X_{12}, Y_{12})$ and $(X_{14}, Y_{14})$ and their average coordinate is $(X, Y)$, as shown in FIG. 9*a*.

Then, a user (not shown) can rotate the remote controller 20 to simulate a rotation of analog knob. Since the image sensor 24 is integrated in the remote controller 20, the image sensor 24 rotates simultaneously. For instance, in this embodiment, the user rotates the remote controller 20 in the clockwise direction, therefore the images of the reference objects 12 and 14 forming on the sensing array of the image sensor 24 rotates an angle θ in the counterclockwise direction, as shown in FIG. 9*a*, wherein the images $I_{12}$ and $I_{14}$ become the images $I_{12}'$ and $I_{14}'$ after rotation and their new coordinates are respectively $(X_{12}', Y_{12}')$ and $(X_{14}', Y_{14}')$ and their new average coordinate is $(X', Y')$ (step 1500). And the information after rotating are also stored in the processing unit 26. In this embodiment, there are two options to calculate the rotating angle of the remote controller 20 (image sensor 24). The first of them is to utilize an angle between the connection line from the average coordinate $(X, Y)$ to the center "+" of the sensing array of the image sensor 24 and the connection line from the average coordinate (X', Y') to the center "+" of the sensing array of the image sensor 24 to calculate the rotating angle of the image sensor 20, as shown in FIG. 9a, and it is shown as an angle θ.

Figure 9B:
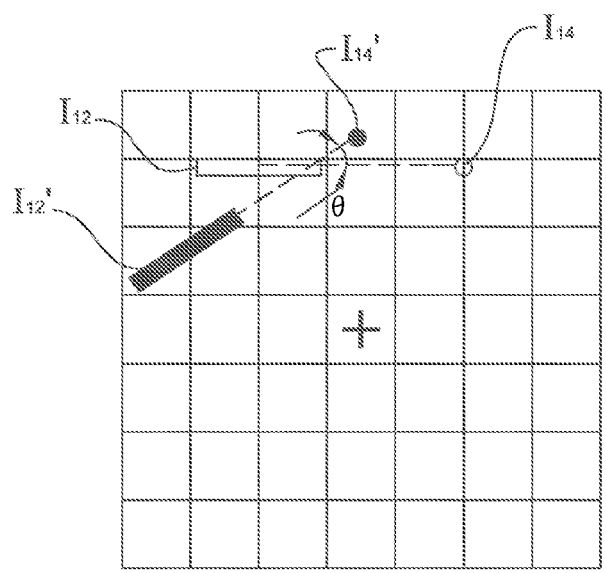
FIG. 9b shows a schematic view of another method to calculate a rotating angle of the remote controller while photographing.

Referring to FIG. 9b, there is shown another method to calculate the rotating angle of the remote controller 20, wherein $I_{12}$ and $I_{14}$ denote the images of the reference objects 12 and 14 before rotating the remote controller 20 and $I_{12}'$ and $I_{14}'$ denote the images of the reference objects 12 and 14 after rotating the remote controller 20. The rotating angle is an angle θ between the connection line of the images $I_{12}$, $I_{14}$ and the connection line of the images $I_{12}'$, $I_{14}'$. The processing unit 26 can correspondingly control the function statuses adjusting and setting of the image display 10 according to the calculated rotating angle.

Referring to FIG. 8 again, in order to adjust a variation sensitivity of the function status, a step parameter may be inputted to the processing unit 26 during the calculation of the rotating angle (step 1610). For instance, in this embodiment, the step parameter is defined as 2 degrees. In other words, the quasi-analog knob controlling method according to the present invention can identify at least 2 rotation degrees. Since an identifiable range is between 358 degrees clockwise and counterclockwise, there are 179 steps can be adjusted. In other embodiment, the identifiable angle can be changed by changing the step parameter and it is possible to define low variation sensitivity by inputting a large step parameter, i.e. a relatively large rotating angle of the remote controller 20 is needed to form the variation of the function status. It is also possible to define high variation sensitivity by inputting a small step parameter. The definitions are all depending on different applications.

Figure 10A:
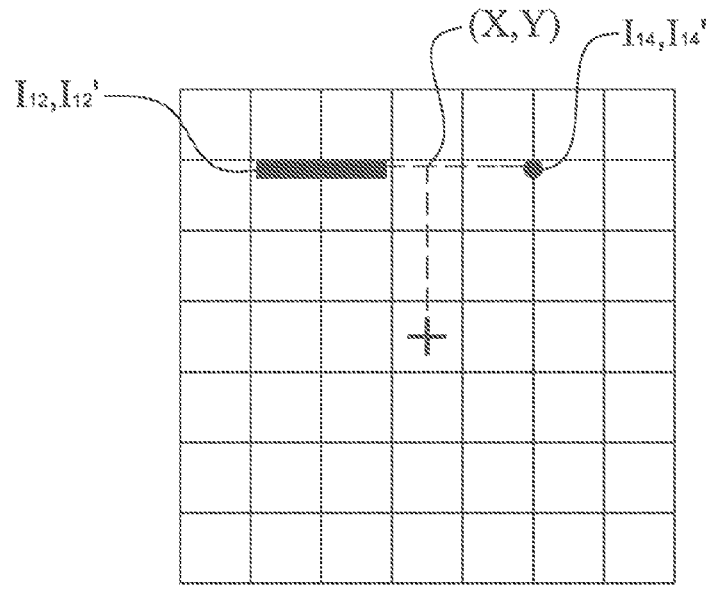
FIG. 10a shows a schematic view of an image detected by the image sensor of the control apparatus according to the embodiment of the present invention, wherein the remote controller does not rotate while photographing.
Figure 10B:
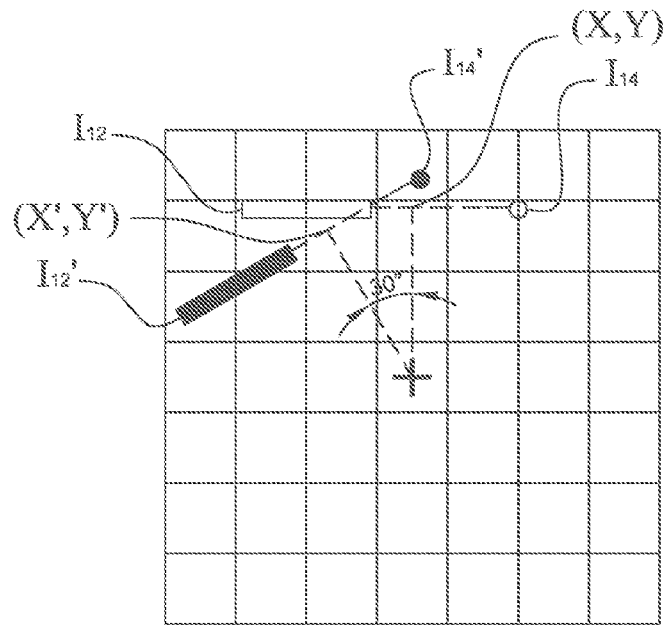
FIG. 10b shows a schematic view of an image detected by the image sensor of the control apparatus according to the embodiment of the present invention, wherein the remote controller is rotated by 30 degrees in the clockwise direction while photographing.
Figure 10C:
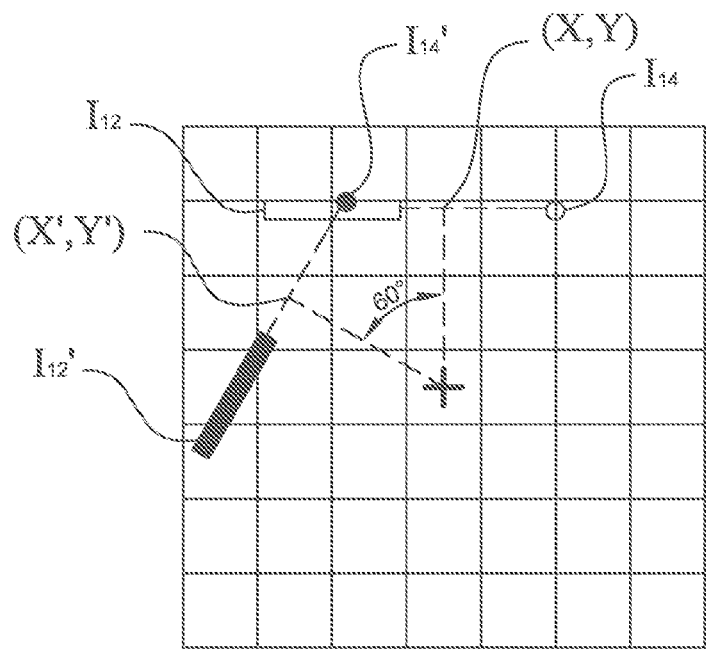
FIG. 10c shows a schematic view of an image detected by the image sensor of the control apparatus according to the embodiment of the present invention, wherein the remote controller is rotated by 60 degrees in the clockwise direction while photographing.
Figure 10D:
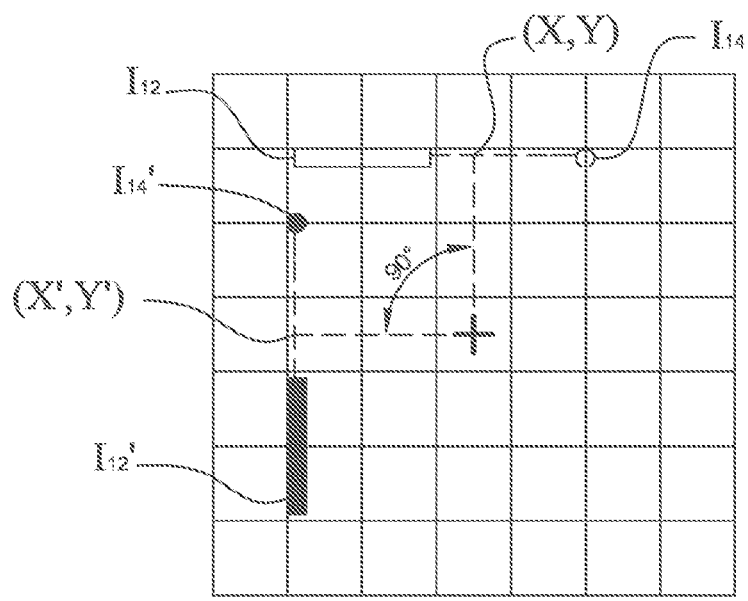
FIG. 10d shows a schematic view of an image detected by the image sensor of the control apparatus according to the embodiment of the present invention, wherein the remote controller is rotated by 90 degrees in the clockwise direction while photographing.
Figure 10E:
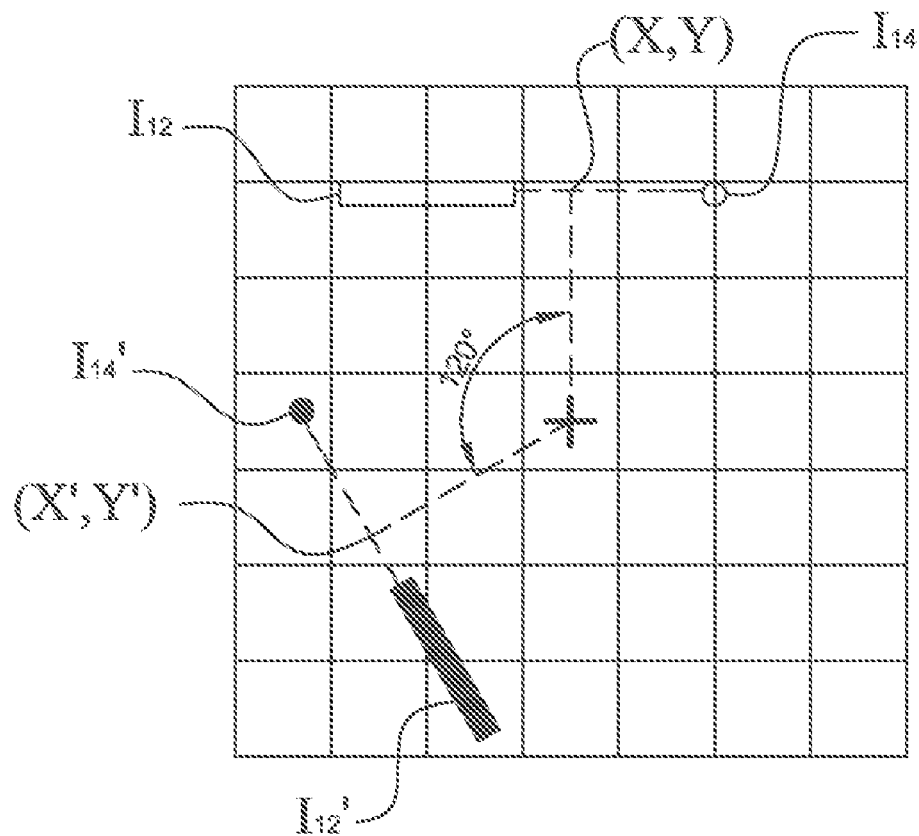
FIG. 10e shows a schematic view of an image detected by the image sensor of the control apparatus according to the embodiment of the present invention, wherein the remote controller is rotated by 120 degrees in the clockwise direction while photographing.

Referring to FIGS. 10a~10e, there are shown digital images formed by the quasi-analog knob controlling method under different rotating angles in the clockwise direction. As shown in FIG. 10a, there is shown a digital image formed on the remote controller 20 without rotation, wherein the positions of the images $I_{12}'$ and $I_{14}'$ are identical to that of the images $I_{12}$ and $I_{14}$ in step 1400, which also may be the predetermined images. The function status may be defined as no variation under this situation. As shown in FIG. 10b, there is shown a digital image formed on the remote controller 20 after rotating 30 degrees in the clockwise direction and the rotating angle between the images $I_{12}'$, $I_{14}'$ and the images $I_{12}$, $I_{14}$ is calculated by the aforementioned first option. In this condition, a variation of the function status may be defined to increase or decrease 20% of the value. As shown in FIG. 10c, there is shown a digital image formed on the remote controller 20 after rotating 60 degrees in the clockwise direction. In this condition, a variation of the function status may be defined to increase or decrease 40% of the value. As shown in FIG. 10d, there is shown a digital image formed on the remote controller 20 after rotating 90 degrees in the clockwise direction. In this condition, a variation of the function status may be defined to increase or decrease 60% of the value. As shown in FIG. 10e, there is shown a digital image formed on the remote controller 20 after rotating 120 degrees in the clockwise direction. In this condition, a variation of the function status may be defined to increase or decrease 80% of the value. It should be noted that, the values defined herein are only a kind of embodiment, and they are not used to limit the present invention. In other embodiment, the values can be defined differently according to different applications. In addition, although the above illustrations are only focused on the clockwise rotation of the remote controller 20, the operation and detailed procedures in the counterclockwise rotation of the remote controller 20 are similar to that of clockwise rotation and the details are not described herein. Although the exemplary embodiments of the present invention only shows the position variation and rotating angle variation of the images of the reference objects 12 and 14, they are not used to limit the present invention. In other embodiment, other kinds of image variations of the images of the reference objects 12 and 14 can be utilized as a reference so as to correspondingly control the image display 10.

As described above, the conventional control apparatus for controlling an image display may be interfered by environmental light sources and has the problem of error control of the image display. The image display control apparatus of the present invention, as shown in FIGS. 1 and 3, can eliminate the interferences caused by the environmental light sources by means of modulating the predetermined spectrum signal generated by the reference object. In this manner, only the image of the reference object will be calculated during image recognition; the image processing complexity can be decreased and the control accuracy can be increased.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A control apparatus for controlling an image display, comprising:
    a first light source having a plurality of first point lights arranged to form a first shape for generating a predetermined spectrum signal;
    a second light source having a plurality of second point lights arranged to form a second shape for generating a predetermined spectrum signal;
    a modulation unit for simultaneously modulating the first point lights of the first light source with a first predetermined modulation frequency and for simultaneously modulating the second point lights of the second light source with a second predetermined modulation frequency to generate a modulated predetermined spectrum signal; and
    a remote controller, comprising:
        an image sensor for receiving the modulated predetermined spectrum signal at an image sampling frequency, which is an integer times of the first predetermined modulation frequency and the second predetermined modulation frequency, and generating a digital signal; and
        means for receiving the digital signal, identifying the first light source based on the first shape arranged by the first point lights and the second light source based on the second shape arranged by the second point lights, determining a rotation of the remote controller according to the first and second light sources identified, and identifying whether sampled images of the first and second light sources in the digital signal match the first predetermined modulation frequency and the second predetermined modulation frequency so as to eliminate interference from a light source which generates a light band overlapping at least a part of the band of the predetermined spectrum signal.

2. The control apparatus according to claim 1, wherein the image display is selected from the group consisting of a television, the screen of a game machine, a monitor and a projection screen.

3. The control apparatus according to claim 1, wherein the first and the second predetermined modulation frequencies have a multiple relationship.

4. The control apparatus according to claim 3, wherein the first and the second predetermined modulation frequencies are both lower than the image sampling frequency of the image sensor and the first and the second predetermined modulation frequencies respectively have a multiple relationship with the image sampling frequency.

5. The control apparatus according to claim 1, further comprising an optical filter disposed in front of the image sensor for blocking spectrum signals outside the band of the predetermined spectrum signal.

6. The control apparatus according to claim 5, wherein the band of the predetermined spectrum signal is in the IR spectrum and the optical filter is an IR filter.

7. The control apparatus according to claim 1, wherein the remote controller further comprises a wireless communication unit for sending a control signal to the image display thereby correspondingly controlling the image display.

8. The control apparatus according to claim 1, wherein the remote controller is electrically connected to the image display and correspondingly controls the image display.

9. The control apparatus according to claim 1, wherein the image sensor is a CMOS image sensor or a CCD image sensor.

10. The control apparatus according to claim 1, wherein the first and second light sources and the modulation unit are integrated on the image display or manufactured as a discrete component.

11. The control apparatus according to claim 1, wherein the means is further for calculating a position variation or a rotating angle variation of the sampled images of the first and second light sources.

12. The control apparatus according to claim 1, wherein the first and second light sources have a line shape and a star shape, respectively.

13. A control method for controlling an image display, comprising the steps of:
  generating a predetermined spectrum signal with a first light source having a plurality of first point lights arranged to form a first shape and a second light source having a plurality of second point lights arranged to form a second shape;
  simultaneously modulating the first point lights of the first light source with a first predetermined modulation frequency and simultaneously modulating the second point lights of the second light source with a second predetermined modulation frequency to generate a modulated predetermined spectrum signal;
  receiving, using an image sensor of a remote controller, the modulated predetermined spectrum signal at an image sampling frequency, which is an integer times of the first predetermined modulation frequency and the second predetermined modulation frequency, and generating a digital signal;
  identifying the first light source based on the first shape arranged by the first point lights and the second light source based on the second shape arranged by the second point lights and determining a rotation of the remote controller according to the first and second light sources identified; and
  identifying whether sampled images of the first and second light sources in the digital signal match the first predetermined modulation frequency and the second predetermined modulation frequency so as to eliminate interference from a light source which generates a light band overlapping at least a part of the band of the predetermined spectrum signal.

14. The control method according to claim 13, further comprising the step of:
  disposing an optical filter in front of the image sensor for blocking spectrum signals outside the band of the predetermined spectrum signal.

15. The control method according to claim 14, wherein the band of the predetermined spectrum signal is in the IR spectrum and the optical filter is an IR filter.

16. The control method according to claim 14, wherein the image sensor is a CMOS image sensor or a CCD image sensor.

17. The control method according to claim 13, further comprising: calculating a position variation or a rotating angle variation of the sampled images of the first and second light sources.

* * * * *